(12) United States Patent
Levola et al.

(10) Patent No.: US 8,160,411 B2
(45) Date of Patent: Apr. 17, 2012

(54) DEVICE FOR EXPANDING AN EXIT PUPIL IN TWO DIMENSIONS

(75) Inventors: Tapani Levola, Tampere (FI); Pasi Saarikko, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/521,577

(22) PCT Filed: Dec. 28, 2006

(86) PCT No.: PCT/FI2006/050590
§ 371 (c)(1),
(2), (4) Date: Aug. 17, 2010

(87) PCT Pub. No.: WO2008/081070
PCT Pub. Date: Jul. 10, 2008

(65) Prior Publication Data
US 2010/0321781 A1    Dec. 23, 2010

(51) Int. Cl.
G02B 6/34 (2006.01)
G02B 5/18 (2006.01)

(52) U.S. Cl. ............... 385/37; 385/15; 385/31; 385/129; 385/130; 385/131; 385/132; 359/466; 359/569

(58) Field of Classification Search ............... 385/15, 385/31, 37, 129–132; 359/466, 569
See application file for complete search history.

(56) References Cited

U.S. PATENT DOCUMENTS
5,455,178 A * 10/1995 Fattinger .............. 436/164

(Continued)

FOREIGN PATENT DOCUMENTS
| EP | 0535402 A1 | 4/1993 |
| WO | 9952002 A1 | 10/1999 |
| WO | 2006064334 A1 | 6/2006 |

OTHER PUBLICATIONS

Office Action received in corresponding Chinese Application No. 2006800568795, Apr. 13, 2010, 4 pages.

(Continued)

Primary Examiner — Brian M. Healy
Assistant Examiner — Guy Anderson
(74) Attorney, Agent, or Firm — Nokia Inc.

(57) ABSTRACT

A diffractive beam expander (50) comprises an input grating (10), a crossed grating (20), and an output grating (30) implemented on a planar transparent substrate (7). The crossed grating (20) comprises a plurality of diffractive features (23) arranged along the lines of a first set of parallel lines (25) and along the lines of a second set of parallel lines (26) such that the lines (25) of the first set are parallel to the lines (26) of the second set. The lines of the first set have a first grating period and the lines of the second set have a second grating period. A light beam (B1) coupled into the substrate (7) by the input grating (10) impinges on the crossed grating (20) at a first location (EC1) and further locations (EC2). Interaction at the first location (EC1) provides several sub-beams ($S_{00}$, $S_{01}$, $S_{10}$) which propagate in different directions. Further interactions at second locations (EC2) provide further sub-beams ($V_{01}$, $U_{10}$) which propagate in the same direction as the original in-coupled light (B1). Light is subsequently coupled out of the substrate (7) by the output grating (30) to provide a light beam (B2) which is expanded in two directions (SX, SZ) with respect to the beam (B0) impinging on the input grating. A virtual display device (200) may comprise said diffractive beam expander (50).

15 Claims, 11 Drawing Sheets

U.S. PATENT DOCUMENTS

| | | |
|---|---|---|
| 5,682,255 A | 10/1997 | Friesem |
| 7,515,340 B1 * | 4/2009 | Shiu et al. .................... 359/569 |
| 2006/0126181 A1 | 6/2006 | Levola |
| 2006/0228073 A1 | 10/2006 | Mukawa |
| 2009/0303599 A1 | 12/2009 | Levola |
| 2010/0232016 A1 * | 9/2010 | Landa et al. ................. 359/466 |
| 2010/0284085 A1 | 11/2010 | Laakkonen |

OTHER PUBLICATIONS

International Search Report and Written Opinion received in corresponding Patent Cooperation Treaty Application No. PCT/FI2006/050590, Sep. 28, 2007, 9 pages.

* cited by examiner

DEVICE FOR EXPANDING AN EXIT PUPIL IN TWO DIMENSIONS

RELATED APPLICATION

This application was originally filed as PCT Application No. PCT/FI2006/05090 filed on Dec. 28, 2006.

The present invention relates to expanding light beams by diffractive elements. The present invention relates also to displaying virtual images.

BACKGROUND OF THE INVENTION

Display modules are used in portable devices to display information in graphical form. Small size is an important aspect in portable devices.

However, the small size of a portable device also sets a limitation to the size of a display incorporated in said device. A typical drawback of a conventional small display is that an observer can examine only a small portion of a large displayed image at a glance, while preserving adequate resolution.

Large images may be displayed by a small device e.g. when the device comprises a near-eye virtual display. An imaging optics may convert a small real image generated by a micro-display into a virtual image. An observer may place the device near his eye such that when light provided by the imaging optics impinges on his eye, he perceives an impression of a large detailed virtual image displayed at an infinite distance.

The micro-display and the imaging optics may be made even smaller and/or lightweight when the light beam provided by the imaging optics is expanded by using a diffractive beam expander, which is also known as an exit pupil expander (EPE). A near-eye display based on a diffractive beam expander is disclosed e.g. in a patent application EP0535402. The U.S. Pat. No. 6,580,529 discloses a diffractive beam expander for expanding a light beam in two dimensions, i.e. horizontally and vertically.

SUMMARY OF THE INVENTION

The object of the invention is to provide a diffractive beam expander for expanding a light beam in two dimensions. A further object of the invention is to provide a device for displaying virtual images.

According to a first aspect of the invention, there is provided a diffractive beam expander according to claim 1.

According to a second aspect of the invention, there is provided a method for expanding a light beam according to claim 9.

According to a third aspect of the invention, there is provided beam expanding means according to claim 11.

According to a fourth aspect of the invention, there is provided a device for displaying virtual images according to claim 13.

According to a fifth aspect of the invention, there is provided a method for displaying virtual images according to claim 15.

The diffractive beam expander comprises an input grating to couple an input beam into a waveguiding substrate. The in-coupled light beam impinges on a crossed grating at a first location and at further locations. First interaction between the light and the crossed grating provides sub-beams which propagate in different directions. Further interactions between the sub-beams and the crossed grating provide further sub-beams which are transversely shifted with respect to each other and which propagate in the same direction as the original in-coupled light beam.

In other words, the first interaction with the crossed grating may change the direction of light beams, and the further interactions may restore the direction of the light beams. Consequently, the in-coupled beam is expanded.

Sub-beams which have the same direction are coupled out of the substrate by an output grating in order to provide an output beam which is enlarged in two dimensions with respect to the input beam and which propagates in the same direction as said input beam.

The crossed grating comprises a plurality of diffractive features arranged along lines of a first set of substantially parallel lines and along lines of a second set of substantially parallel lines. The lines of the first set are perpendicular to the lines of said second set and the lines of the first set are inclined with respect to the linear diffractive features of the input grating. The lines of the first set have a first grating period and the lines of the second set have a second grating period.

A device, in particular a portable device, may comprise a diffractive beam expander in order to expand the exit pupil of a virtual display.

In an embodiment, light is diffracted up to four times to diffraction orders other than zero by the gratings in order to expand a light beam, i.e. once by the input grating, twice by the crossed grating, and once by the output grating. Thus, the image quality may be better than in those prior art approaches which require more than four consecutive diffractions. The overall efficiency of coupling light from the input grating to the output grating may also be improved.

The crossed grating may be implemented on the same plane as the input grating and/or the output grating, which facilitates producing of the diffractive beam expander.

In an embodiment, the center of the input grating, the center of the crossed grating, and the center of the output grating may be located substantially on the same line.

The embodiments of the invention and their benefits will become more apparent to a person skilled in the art through the description and examples given herein below, and also through the appended claims.

BRIEF DESCRIPTION OF THE FIGURES

In the following examples, the embodiments of the invention will be described in more detail with reference to the appended drawings, in which FIG. 2a shows an optical engine and a diffractive beam expander.

DETAILED DESCRIPTION

Figure 1:
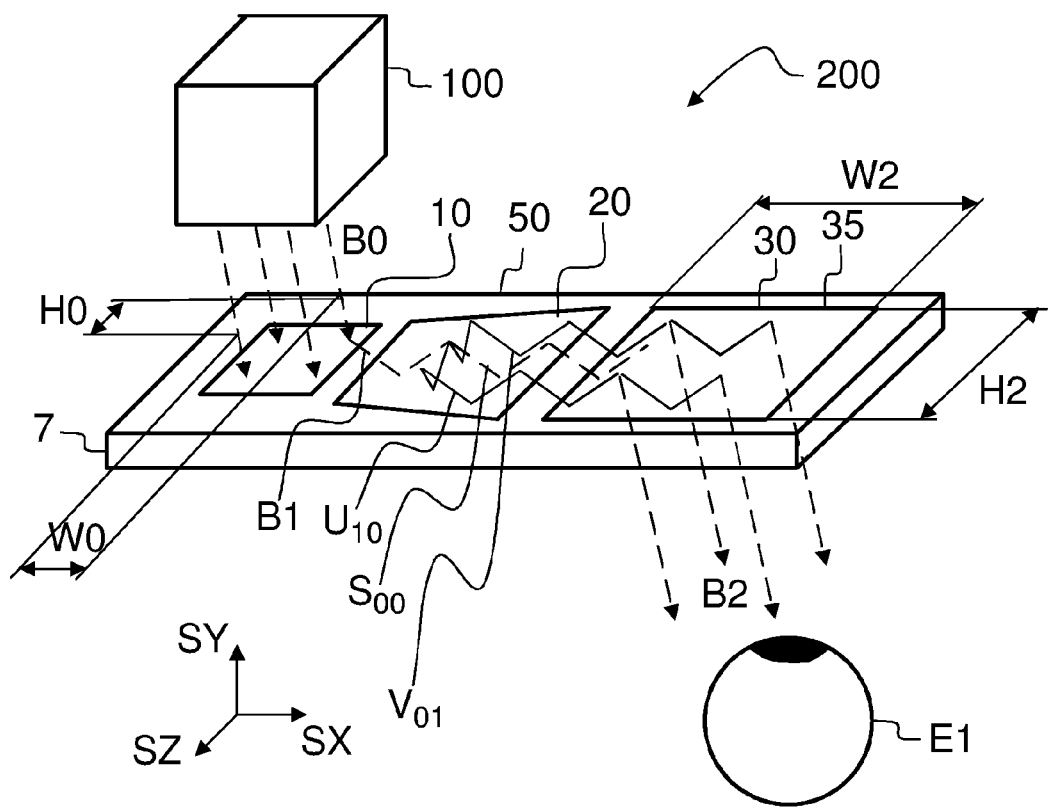
FIG. 1 shows, in a three dimensional view, an optical engine and a diffractive beam expander.
Figure 1:
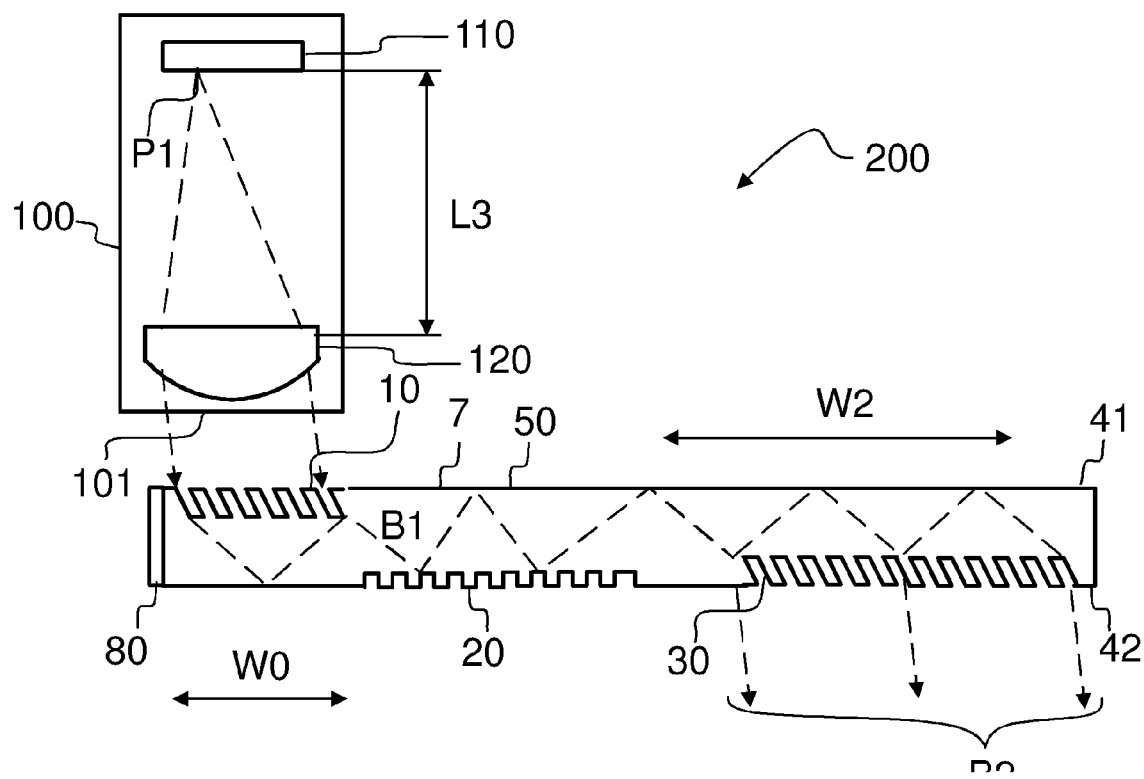
Figure 2B:
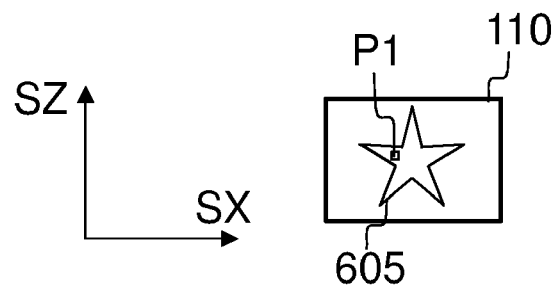
FIG. 2b shows a real image on a micro-display.

Referring to FIG. 1, a virtual display device 200 may comprise an optical engine 100 and a diffractive beam expander 50. The optical engine 100 comprises a micro-display 110 and imaging optics 120 (FIG. 2a). The imaging optics 120 converts a real image 605 (FIG. 2b) formed by the micro-display into a virtual image 710 (FIG. 10) which is observable through a viewing aperture 35 of the diffractive beam expander 50.

The diffractive beam expander 50 comprises an input grating 10, a crossed grating 20, and an output grating 30 implemented on a substantially planar transparent substrate 7. The substrate 7 has a first substantially planar surface, and a second substantially planar surface which is substantially parallel to said first planar surface.

The substrate 7 is waveguiding, which means that in-coupled light may propagate within said substrate 7 such that said propagating light may be confined to said substrate 7 by total internal reflections (TIR).

The optical engine 100 provides an input beam B0. The input beam B0 impinging on the input grating 10 may be coupled into the substrate 7 such that a corresponding in-coupled beam B1 propagates within said substrate towards the crossed grating 20.

The input grating 10 has typically only two diffraction orders, namely diffraction orders 1 and −1, which couple light into the substrate 7. The present discussion concentrates mainly on the propagation of light which is coupled into the substrate 7 by the diffraction order 1. Based on the present discussion, a skilled person may derive the propagation of light which is coupled into the substrate 7 by the diffraction order −1, because the in-coupled beams corresponding to the diffraction orders −1 and 1 propagate typically in substantially opposite directions.

The crossed grating 20 comprises a plurality of diffractive features arranged along a first set of parallel lines and along a second set of parallel lines such that the lines of the first set are perpendicular to the lines of the second set. The lines of the first set have a first grating period and the lines of the second set have a second grating period.

The planar surfaces of the waveguiding substrate 7 are in planes defined by the directions SX and SZ. The direction SX is perpendicular to the direction SZ. The direction SY is perpendicular to the directions SX and SZ.

The in-coupled beam B1 may interact two or more times with the crossed grating pattern 20. The light beam B1 coupled into the substrate 7 by the input grating 10 impinges on the crossed grating 20 at a first location and a further locations. Interaction at the first location may provide sub-beams which propagate transversely with respect to the in-coupled beam B. Interaction at a second location may provide further sub-beams $U_{10}$, $S_{00}$ and $V_{01}$ which are shifted sideways with respect to each other and which propagate in the same direction as the in-coupled beam B1. Thus, the sub-beams $U_{10}$, $S_{00}$ and $V_{01}$ may together form an enlarged beam B1 which propagates in the same direction as the original in-coupled beam B1.

The in-coupled beam B, which now comprises several sub-beams $U_{10}$, $S_{00}$ and $V_{01}$ is subsequently coupled out of the substrate 7 by the output grating 30 to provide an output beam B2 which is expanded in two directions SX, SZ when compared to the input beam B0. The output beam B2 may impinge on the eye E1 of an observer.

The viewing aperture 35 is defined by the perimeter of the output grating 30. The viewing aperture 35 may also be smaller than the output grating 30 if a mask is superposed over said grating 30, e.g. in order to modify the visual appearance of a display device 200, which comprises the diffractive beam expander 50.

The viewing aperture 35 has a height H2 and a width W2. The input beam B0 has a height H0 and a width W0. The maximum width of the output beam B2 is defined by the width W2 of the viewing aperture 35, and the maximum height, i.e. vertical dimension, of the output beam B2 is defined by the height H2 of the output aperture 35. The height H2 and the width W2 of the viewing aperture 35 may be selected to be greater than the height H0 and the width W0 of the input beam BO in order to expand the exit pupil of the optical engine 100 in two dimensions. The height and the width of the input grating may be selected to be substantially equal to or greater than the dimensions of the input beam B0, in order to maximize the efficiency of coupling light into the substrate 7.

Figure 9:
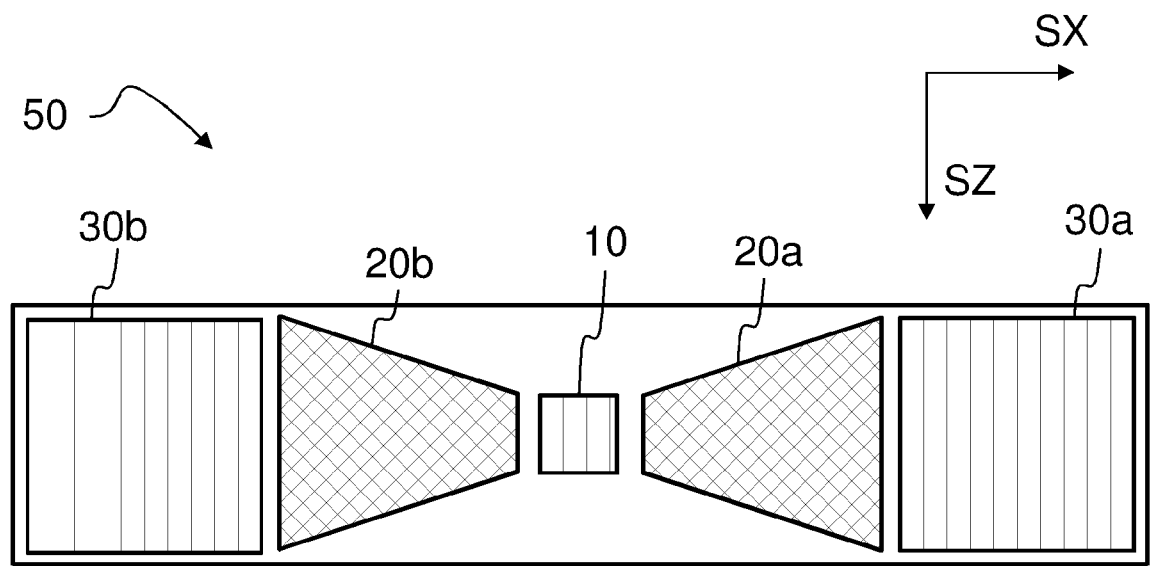
FIG. 9 shows a bi-ocular diffractive beam expander.

The gratings 10, 20, 30 are diffractive elements. The gratings 10, 20, 30 may be e.g. surface relief gratings implemented by molding or embossing. The profile of the gratings 10, 20, 30 may be e.g. sinusoidal, binary rectangular, or blazed. Yet, the profile of the gratings 10, 20, 30 may be e.g. binary slanted or sinusoidal slanted. One or more gratings 10, 20, 30 may be embedded in the substrate 7. The diffractive beam expander 50 may also comprise more than three diffractive elements 10, 20, 30 (FIG. 9).

The crossed grating 20 may be substantially between said input grating 10 and said output grating 30 such that the centers of the cratings 10, 20, 30 are substantially on the same line.

Referring to FIG. 2a, the optical engine 100 may comprise a micro-display 110 and imaging optics 120. The imaging optics 120 may comprise one or more optical elements such as lenses, mirrors, prisms or diffractive elements. Light rays transmitted from a point P1 of the micro-display 110 are substantially collimated by the imaging optics 120 to form parallel rays of light which constitute the beam B0 provided by the optical engine 100. The distance L3 between the micro-display 110 and the imaging optics 120 is set such that the pixels of the micro-display 110 are substantially at the focal distance of the imaging optics 120. A plurality of beams B0 are provided in order to display a virtual image, which consists of a plurality of pixels.

At least one beam BO transmitted from the output aperture 101 of the optical engine 100 impinges on the input grating 10 of the diffractive beam expander 50. Light of the input beam B0 is coupled into the waveguiding substrate 7 by the input grating 10. The in-coupled light propagates within the substrate 7 as the in-coupled beam B1 and interacts with the crossed grating 20 at two or more locations. The output grating 30 diffracts the expanded output beam B2 towards the eye E1 of an observer.

Figure 10:
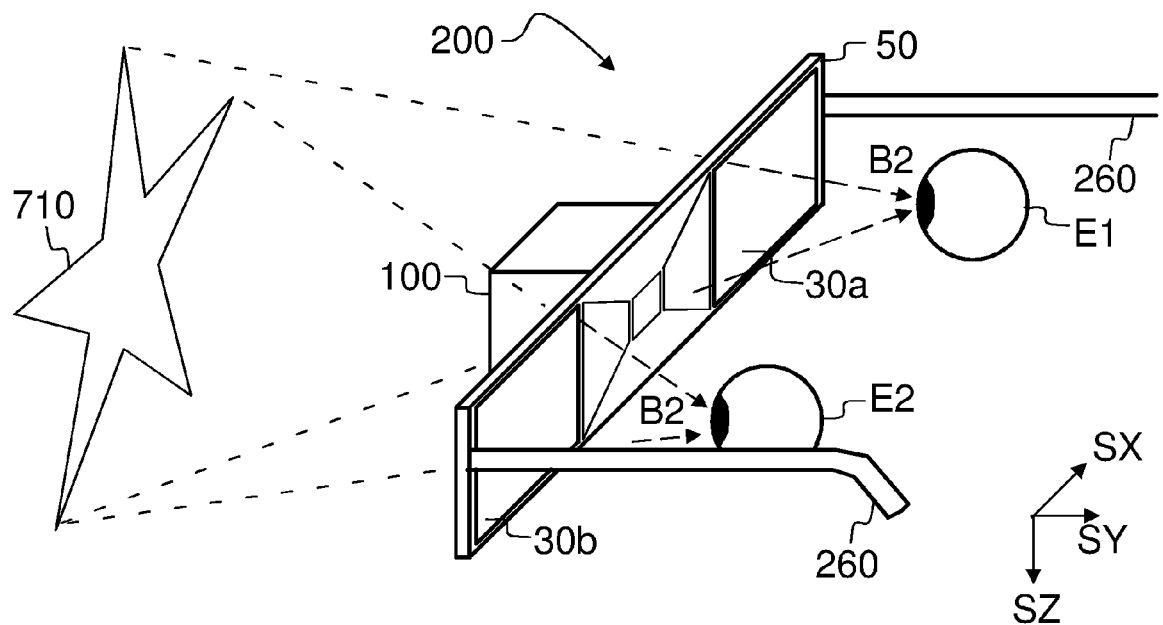
FIG. 10 shows, in a three dimensional view, a bi-ocular display device for showing virtual images.

The enlarged light beams B2 provided by the diffractive beam expander 50 provide for a viewer an impression of a virtual image 710 displayed at an infinite distance from the viewer. As a phenomenon, human viewers typically perceive that the displayed virtual image 710 is only a few meters away from them, despite the infinite distance. The virtual image 710 may be e.g. a star pattern, as shown in FIG. 10.

The diffractive beam expander 50 may be mono-ocular, i.e. it may have only one output grating 30. The input grating 10 and the output grating 30 may be slanted or blazed surface relief gratings in order to maximize the efficiency of coupling light into the substrate 7 and out of the substrate 7. The diffractive beam expander 50 may comprise one or more optically absorbing structures 80 to eliminate stray light.

The substrate 7 has a first substantially planar surface 41 and a second substantially planar surface 42 which is substantially parallel to said first planar surface 41. The gratings 10, 20, 30 may be on the same planar surface 41 of the waveguiding substrate 7, or on different planar surfaces 41, 42 of the waveguiding substrate 7. In FIG. 2a, the input grating 10 and the output grating 30 are on the first surface 41 and the crossed grating 20 is on the second surface 42. The input beam B0 may also be transmitted through the substrate 7 before impinging on the input grating 10. There may be 2×2×2=8 alternatives to select on which surfaces the gratings 10, 20, 30 are implemented, with respect to the direction of the input beam B0.

The micro-display 110 may be e.g. a liquid crystal display, an array of micromechanically movable mirrors, or an array of light emitting diodes. The expression "micro" means herein that the micro-display is smaller than the display device 200. The width of the micro-display may be e.g. smaller than or equal to 25 mm.

FIG. 2b shows a real image 605 formed on the micro-display 110. The real image 605 may be formed of a plurality of light emitting pixels or points P1.

Figure 3A:
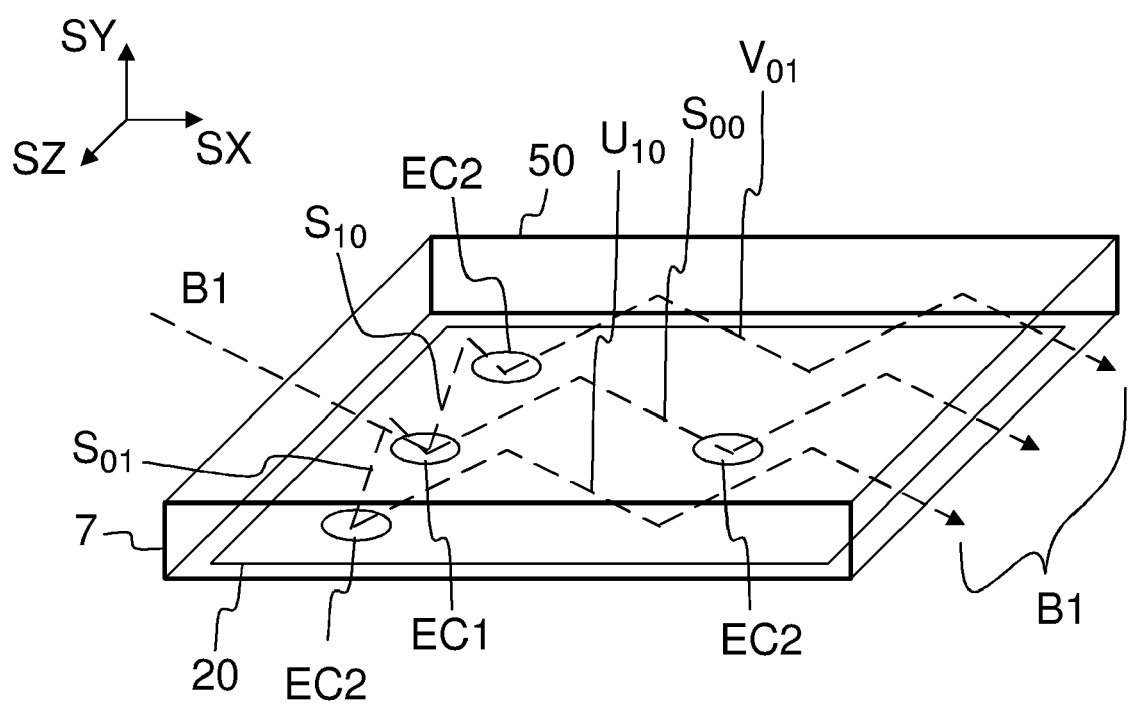
FIG. 3a shows, in a three dimensional view, splitting of an in-coupled beam into several sub-beams.

Referring to FIG. 3a, the in-coupled beam B1 impinges on the crossed grating 20 at least at locations EC1, EC2. The in-coupled beam B1 may be split into sub-beams $S_{00}$, $S_{10}$ and $S_{01}$ at a location EC1 of a first interaction between the beam B1 and the crossed grating 20. The sub-beam $S_{00}$ propagates in the same direction as the in-coupled beam B1, and the sub-beams $S_{10}$ and $S_{01}$ propagate transversely. Second interactions at the second locations EC2 may provide further sub-beams $V_{01}$ and $U_{10}$ which propagate in the same direction as the sub-beam $S_{00}$ and the original in-coupled beam B1.

The symbol EC2 refers to a plurality of locations which are different from the location EC1.

Figure 3B:
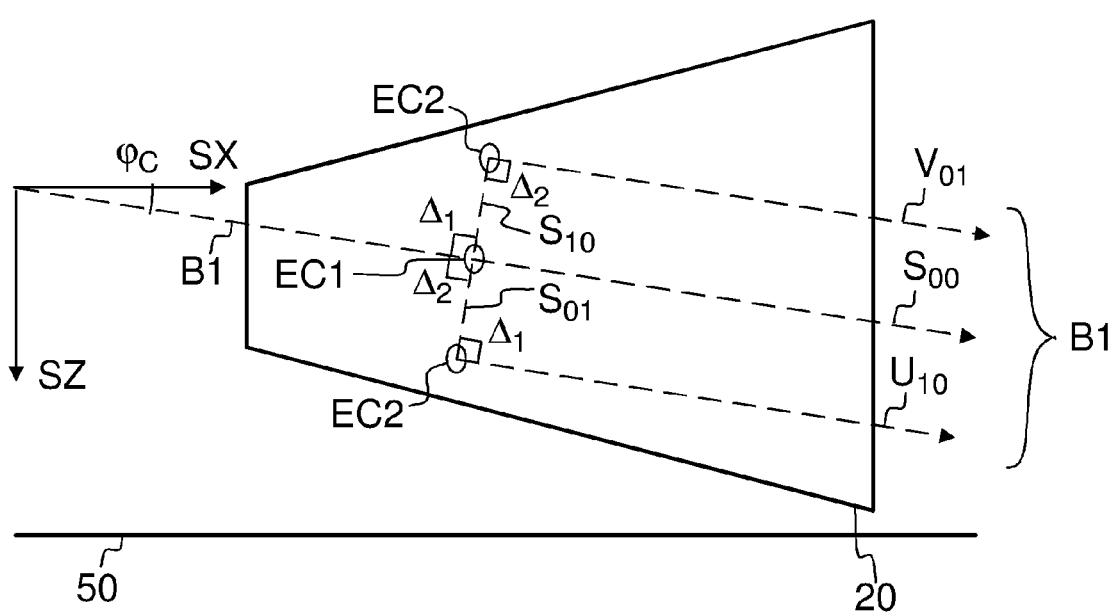
FIG. 3b shows splitting of an in-coupled beam into several sub-beams.

Referring to FIG. 3b, the projection of the in-coupled beam B1 has an azimuthal angle $\phi_C$ with respect to the direction SX in a plane defined by the directions SX and SZ. First interaction at the location EC1 provides sub-beams $S_{00}$, $S_{01}$ and $S_{10}$. The sub-beam $S_{00}$ has the same azimuthal angle $\phi_C$ as the original in-coupled beam B1. The projection of the sub-beam $S_{01}$ is at an angle $\Delta 2$ with respect to the projection of the in-coupled beam B1. The projection of the sub-beam $S_{10}$ is at an angle $\Delta 1$ with respect to the projection of the in-coupled beam B1. The angles $\Delta 1$ and $\Delta 2$ may be substantially equal to 90 degrees. Interaction at a second location EC2 may provide a further sub-beams $V_{01}$ and $U_{10}$ which propagate in the same direction as the sub-beam $S_{00}$.

Figure 3C:
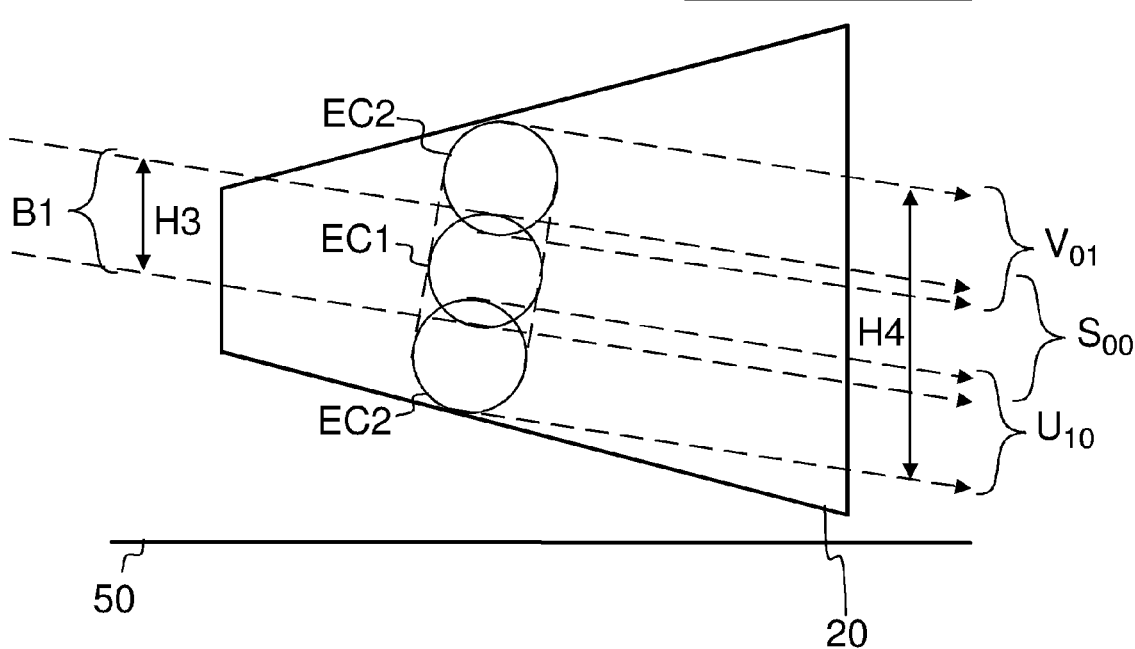
FIG. 3c shows vertical expanding of the in-coupled beam.

FIG. 3c shows how the adjacent sub-beams $U_{10}$, $S_{00}$ and $V_{01}$ of FIG. 3b may constitute an enlarged beam B1. The original height of the beam B0 is H3. After the second interaction, the sub-beams $U_{10}$, $S_{00}$ and $V_{01}$ have been shifted sideways but have the same azimuthal angle $\phi_C$ as the original beam B1. Consequently, the combined height H4 of the sub-beams $U_{10}$, $S_{00}$ and $V_{01}$ is substantially greater than the original height H3 of the beam B1. Thus, the direction-changing interactions at the locations EC1, EC2 enlarge the beam B1 in the vertical direction SZ.

Figure 4:
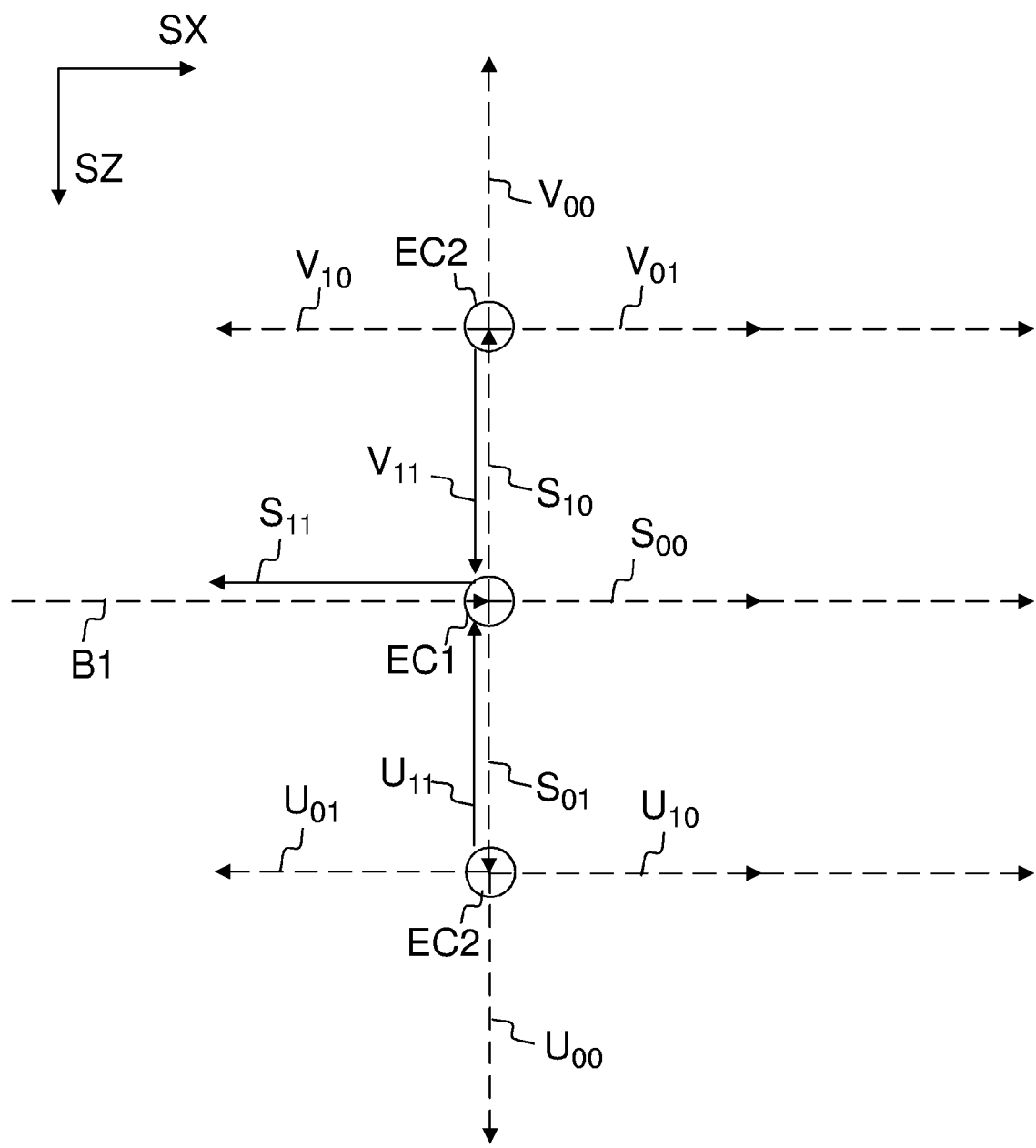
FIG. 4 shows splitting of an in-coupled beam into several sub-beams.

Referring to FIG. 4, interaction of the in-coupled beam B1 with the crossed grating 20 at the location EC1 may provide up to four sub-beams:

two sub-beams $S_{10}$ and $S_{01}$ which propagate in transverse directions when compared to the direction of the original beam B1, a sub-beam $S_{00}$ propagates in the same direction as the original beam B1, and a sub-beam $S_{11}$ propagates in a direction opposite the direction of the original beam B1.

An interaction of the sub-beam $S_{10}$ with the crossed grating at a second location ENC2 may provide up to four sub-beams:

two sub-beams $V_{10}$ and $V_{01}$ which propagate in transverse directions compared to the direction of the sub-beam $S_{10}$, a sub-beam $V_{00}$ which propagates in the same direction as the sub-beam $S_{10}$, and a sub-beam $V_{11}$ which propagates in a direction opposite the direction of the sub-beam $S_{10}$.

An interaction of the sub-beam $S_{01}$ with the crossed grating at a location ENC2 may provide up to four sub-beams:

two sub-beams $U_{10}$ and $U_{01}$ which propagate in transverse directions compared to the direction of the sub-beam $S_{01}$, a sub-beam $U_{00}$ which propagates in the same direction as the sub-beam $S_{01}$, and a sub-beam $U_{11}$ which propagates in a direction opposite the direction of the sub-beam $S_{01}$.

The parallel sub-beams $S_{00}$, $V_{01}$ and $U_{10}$ form together an enlarged light beam which propagates in the same direction as the in-coupled beam B1. Thus, the parallel sub-beams $S_{00}$, $V_{01}$ and $U_{10}$ may be coupled out of the substrate by the output grating to provide an output beam B2 which propagates in the same direction as the input beam B0.

In FIG. 4, the input beam B1 and the sub-beams $S_{00}$, $V_{01}$ and $U_{10}$ may be considered to propagate right. The sub-beams $S_{11}$, $V_{10}$ and $U_{01}$ may be considered to propagate left. The sub-beams $S_{10}$, $V_{00}$ and $U_{11}$ may be considered to propagate upwards, and the sub-beams $V_{11}$, $S_{01}$ and $U_{00}$ may be considered to propagate downwards.

There may be even more interactions and sub-beams than shown in FIG. 4. Interaction at each further location may provide four further sub-beams.

Figure 5A:
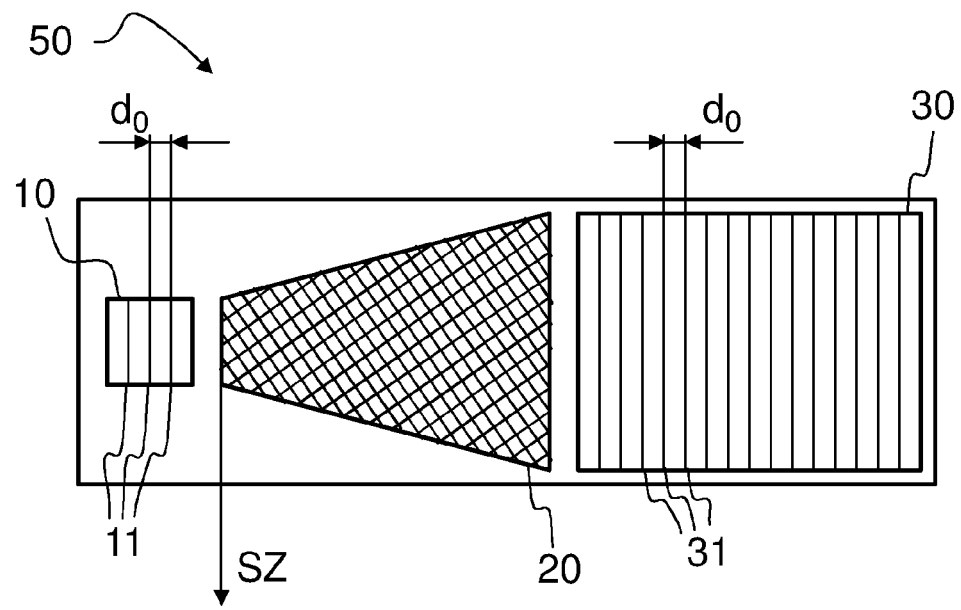
FIG. 5a shows a diffractive beam expander comprising a crossed grating.

Referring to FIG. 5a, the diffractive beam expander 50 comprises the input grating 10, the crossed grating 20 and the output grating 30. The input grating 10 comprises substantially parallel and substantially linear diffractive features 11 having a grating period $d_0$. The diffractive features 11 are substantially parallel to the direction SZ. The output grating 30 comprises substantially linear diffractive features 31. The grating period of the output grating may be substantially equal to the grating period $d_0$ of the input grating 10. The linear diffractive features 11, 31 may be e.g. adjacent grooves or ridges. The linear diffractive features 31 may be substantially parallel to the linear diffractive features 11.

The height of the crossed grating 20 in the direction SZ is selected to be greater than the height H0 of the input beam B0 (FIG. 1). The height of the crossed grating 20 may be selected to be equal to or greater than the height H2 of the viewing aperture 35. The crossed grating 20 may be tapered as shown in FIG. 5a. The perimeter of the crossed grating 20 may also have a rectangular form, but in that case a part of its surface does not interact much with the in-coupled beam B1.

Figure 5B:
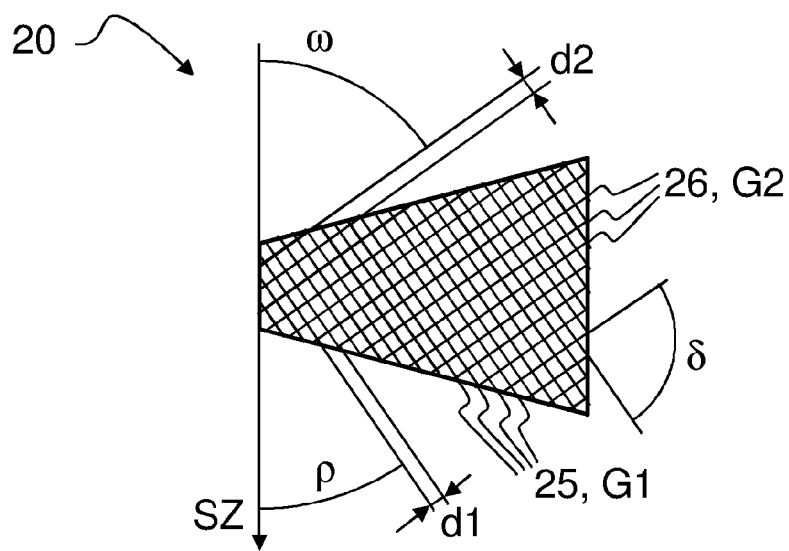
FIG. 5b shows the crossed grating of FIG. 5a, FIG. 5c shows a portion of the surface of a crossed grating.
Figure 5C:
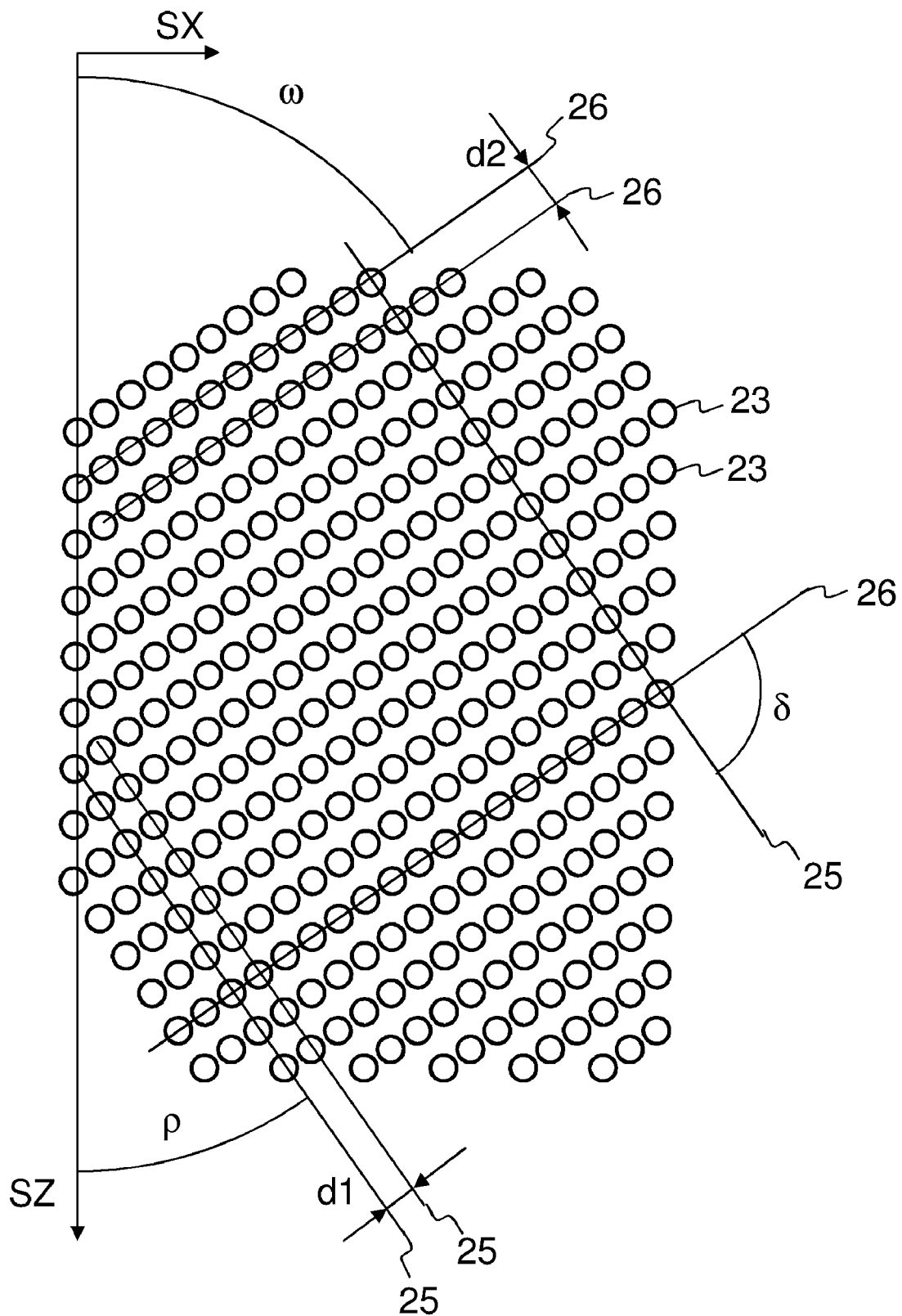

Referring to FIGS. 5b and 5c, the crossed grating 20 comprises two overlapping inclined gratings. The first grating is formed of diffractive features 23 (FIGS. 5c and 6a) which are arranged along the lines 25 of a first set G1 of substantially parallel lines 25. Said diffractive features 23 are also arranged along the lines 26 of a second set G2 of substantially parallel lines 26. The diffractive features 23 may be at the intersections of the lines 25 and the lines 26. The second grating is formed of the diffractive features 23 which are arranged along the lines 26 of the second set G2. The lines 25 of the first set G1 are perpendicular to the lines 26 of the second set, i.e. the angle S between the lines 25, 26 is substantially equal to 90 degrees.

An angle ρ between the orientation of the lines 25 of the first set G1 may be e.g. in the range of 30 to 60 degrees. In particular, the angle ρ may be substantially equal to 45 degrees.

The symbol ω denotes the angle between the orientation of the lines 26 and the direction SZ. The lines 26 of the second set G2 are perpendicular to the lines 25 of the first set G1, thus ω=90°−ρ.

The grating period $d_1$ of the first inclined grating, i.e. the line spacing of the first set G1 may be selected according to the equation (1):

$$d_1 = \frac{d_0}{A_0 \cos\rho}, \tag{1}$$

where $d_0$ is the grating period of the input grating 10, and $A_0$ is a constant having a value in the range of 1.8 to 2.2. In particular, the constant $A_0$ may be substantially equal to two.

The grating period $d_2$ of the second inclined grating, i.e. the line spacing of the second set G2 may be selected according to the equation (2), by using substantially the same value of $A_0$ as in eq. (1):

$$d_2 = \frac{d_0}{A_0 \sin\rho}. \tag{2}$$

If the constant $A_0$ deviates from the value of 2, then the expander 50 should be arranged such that those sub-beams which propagate in a direction opposite to the in-coupled beam B1 do not substantially impinge on the input grating 10 and/or on the output grating 30. Otherwise some out-coupled beams may deviate from the direction of the input beam B0.

Figure 6A:
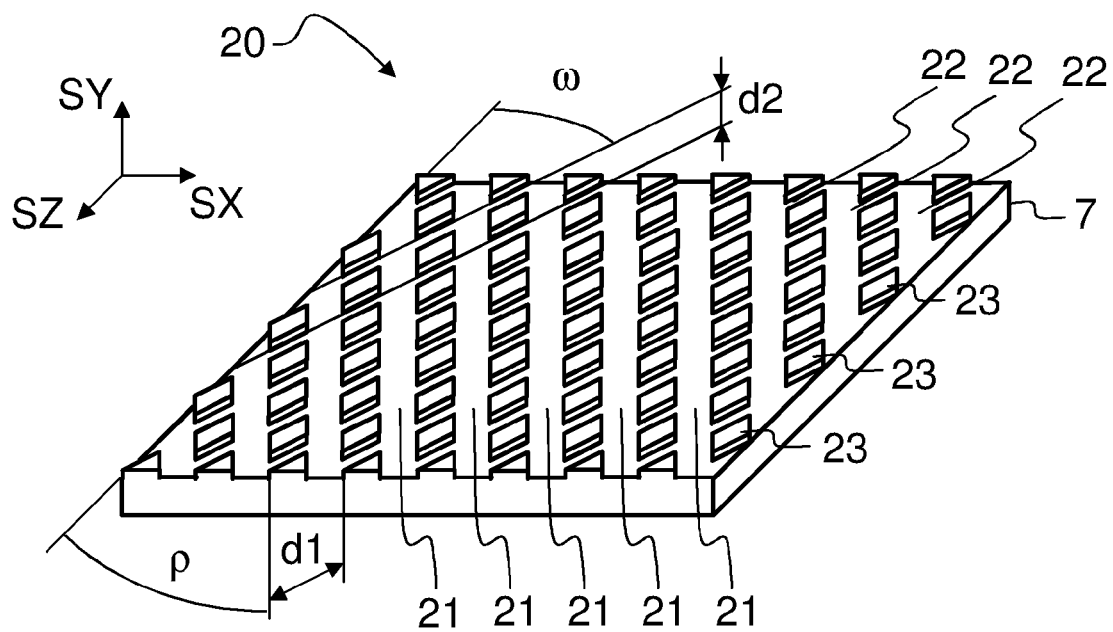
FIG. 6a shows, in a three dimensional view, a portion of the surface of a crossed grating.

Referring to FIG. 6a, the crossed grating 20 may be e.g. a surface relief grating comprising a plurality of diffractive features 23. The diffractive features 23 may be protrusions or recesses. The protrusions may be e.g. round, oval or rectangular microscopic studs. The diffractive features 23 are arranged along the lines 25, 26 as shown in FIGS. 5b and 5c. The diffractive features 23 may define a plurality of diffractive grooves 21 and 22 between them such that the orientation of the grooves 21 is also defined by the angle ρ and the orientation of the grooves 22 is defined by the angle ω. The grooves 21 are perpendicular to the grooves 22. If the diffractive features are recesses, then they define a plurality of diffractive ridges between them.

Figure 6B:
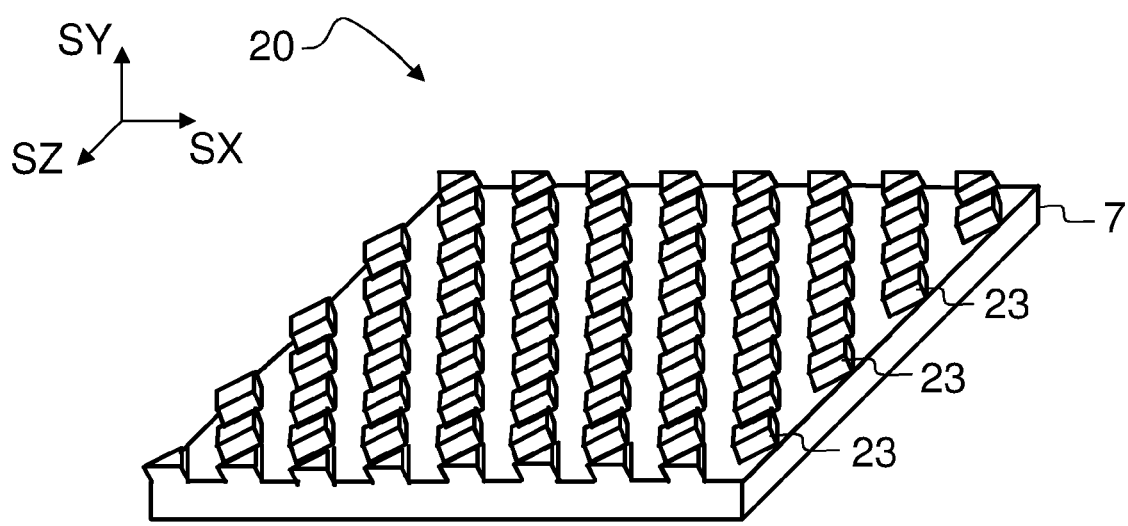
FIG. 6b shows, in a three dimensional view, a portion of the surface of a slanted crossed grating.

Referring to FIG. 6b, the diffractive features 23 of the crossed grating may form a slanted grating profile in order to enhance diffraction efficiency in a predetermined diffraction order.

The crossed grating 20 may be implemented e.g. by embossing or molding.

Figure 7:
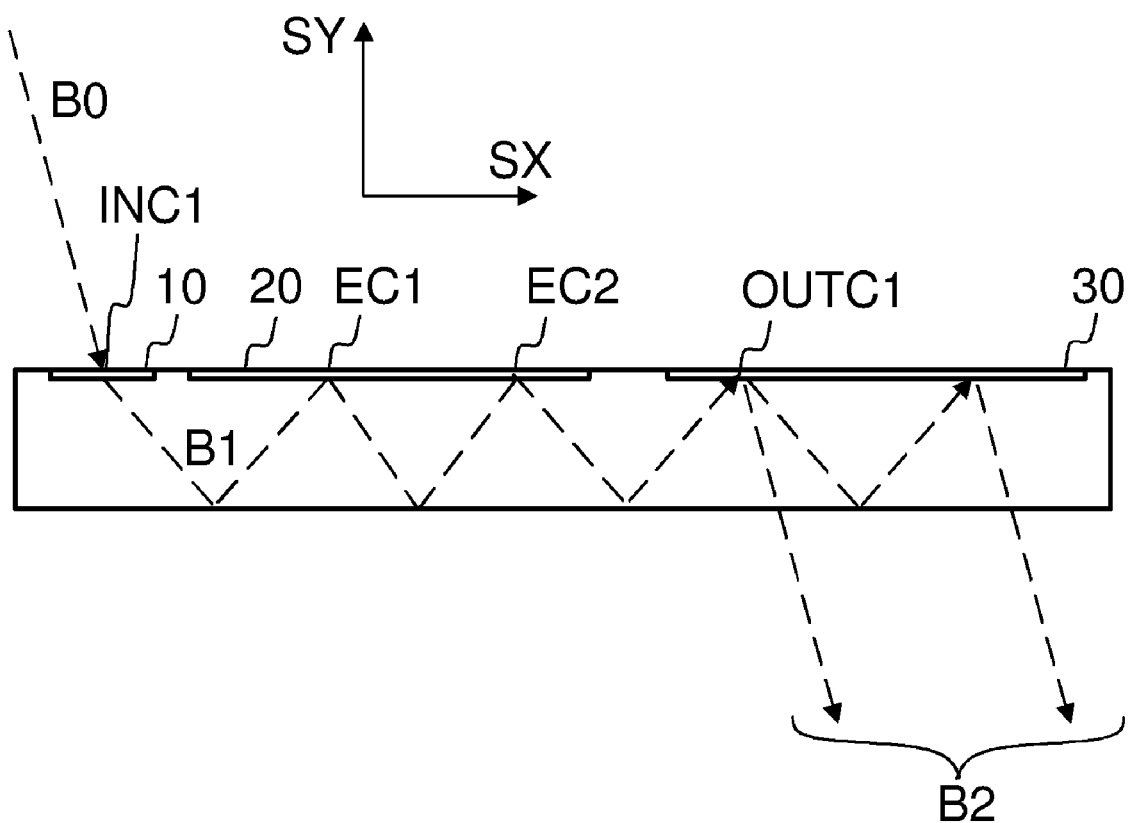
FIG. 7 shows paths of an input beam, an in-coupled beam, and an output beam.

Referring to FIG. 7, the input beam BO is coupled into the waveguiding substrate 7 at an in-coupling location INC1 to form the in-coupled beam B1. The light of the in-coupled beam B1 interacts with the crossed grating 20 at least at a first location of interaction EC1 and at further locations EC2. The interactions EC1 and EC2 provide vertical expansion of the in-coupled beam B1, as shown in FIGS. 3a-4. The vertically expanded beam B1 is coupled out of the substrate 7 by the output grating 30 at the location or locations OUTC1, which provides horizontal beam expansion in the direction SX.

Figure 8A:
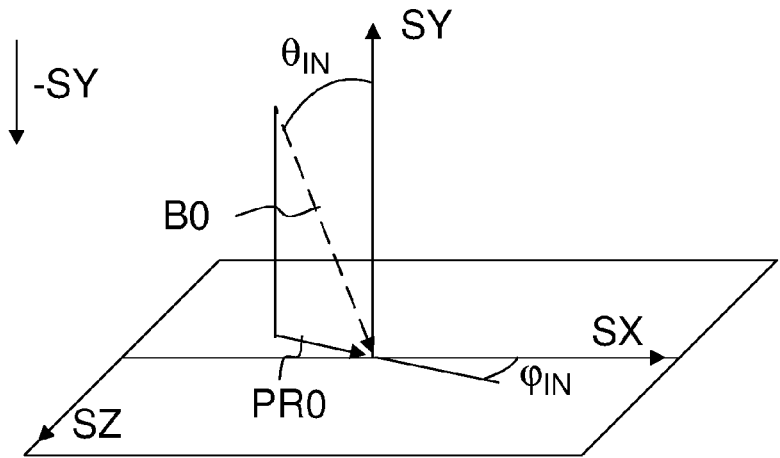
FIG. 8a shows, in a three dimensional view, azimuthal and zenith angles of an input beam.

FIG. 8a shows the azimuthal angle $\phi_{IN}$ of the input beam B0 and zenith angle $\theta_{IN}$ of the input beam B0. The zenith angle $\theta_{IN}$ is an angle between the direction of the beam B0 and the direction −SY. The direction −SY is opposite the direction SY. The surface normal of the input grating 10 is parallel to the direction SY.

The azimuthal angle $\phi_{IN}$ is an angle between the direction SX and the projection PR0, wherein said projection PR0 is the projection of the direction of the input beam B0 in a plane defined by the directions SX and SZ.

Figure 8B:
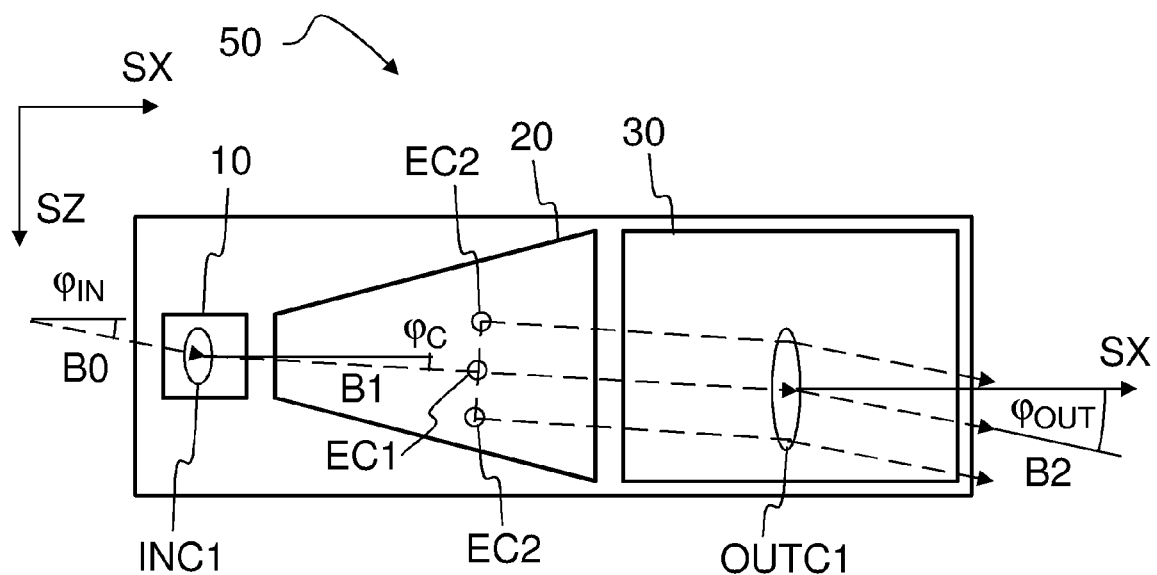
FIG. 8b shows the azimuthal angle of the input beam, azimuthal angle of the in-coupled beam, and azimuthal angle of the output beam.

Referring to FIG. 8b, the projection of the input beam BO on the SX-SZ-plane has an azimuthal angle $\phi_{IN}$ with respect to the direction SX. The projection of the in-coupled beam B1 has an azimuthal angle $\phi_C$ with respect to the direction SX. The projection of the of the output beam B2 has an azimuthal angle $\phi_{OUT}$ with respect to the direction SX.

Figure 8C:
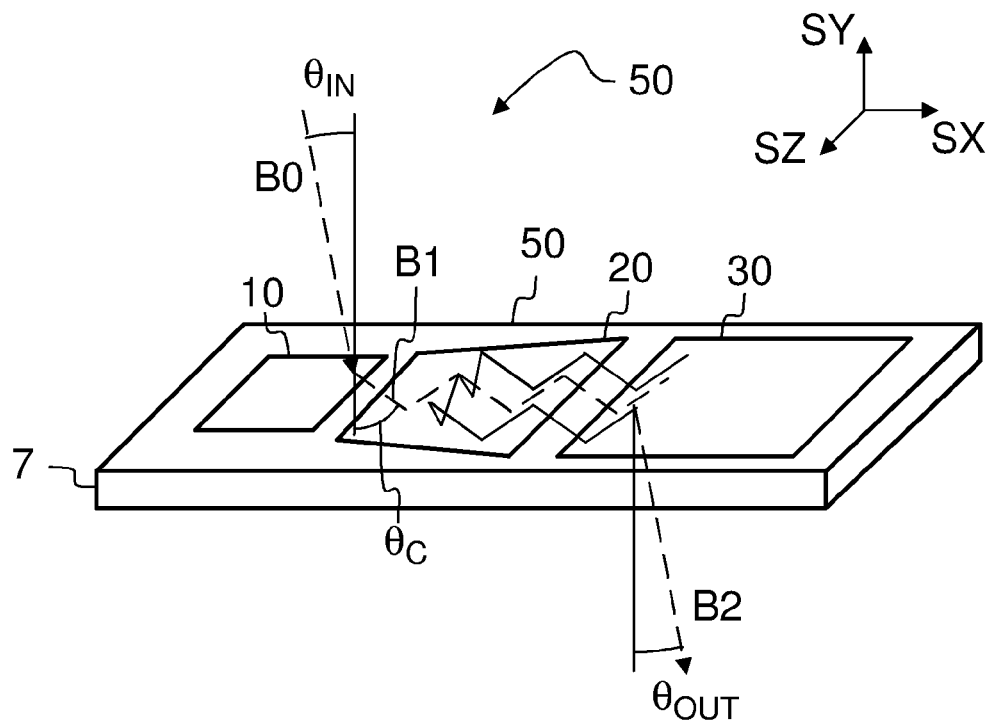
FIG. 8c shows, in a three dimensional view, the zenith angle of the input beam, the zenith angle of the in-coupled beam, and the zenith angle of the output beam.

Referring to FIG. 8c, the direction of the input beam B0 has a zenith angle $\theta_{IN}$ with respect to the direction −SY. The direction of the in-coupled beam B1 has a zenith angle $\theta_C$ with respect to the direction −SY. The direction of the output beam B2 has a zenith angle $\theta_{OUT}$ with respect to the direction −SY.

The diffractions of light beams at the gratings 10, 20, 30 are now discussed by using diffraction equations.

The input beam B0 impinges on the input grating 10. The direction of the input beam B0 is defined by a zenith angle $\theta_{IN}$ and an azimuthal angle $\phi_{IN}$, as shown in FIGS. 8a, 8b and 8c. The components $k_X$, $k_Y$ and $k_Z$ of the wave vector of the beam B0 are given by equations (3), (4) and (5):

$$k_X = \frac{2\pi}{\lambda}\sin\theta_{IN}\cos\varphi_{IN} = \frac{2\pi}{\lambda}\alpha_0, \tag{3}$$

$$k_Y = \frac{2\pi}{\lambda}\cos\theta_{IN} = \frac{2\pi}{\lambda}\beta_0, \text{ and} \tag{4}$$

$$k_Z = \frac{2\pi}{\lambda}\sin\theta_{IN}\sin\varphi_{IN} = \frac{2\pi}{\lambda}\gamma_0, \tag{5}$$

where λ is a predetermined wavelength of the input beam B0. Said predetermined wavelength 2 is in the range of 400 to 760 nm. In particular, the wavelength 2 may be 550 nm, corresponding to the green color.

The sine and cosine terms in eqs. (3), (4) and (5) are substituted by the parameters $\alpha_0$, $\beta_0$ and $\gamma_0$ in order to shorten the mathematical expressions.

Light of the beam B0 is coupled into the substrate by the input grating 10 to form the in-coupled beam B1 propagating in the substrate. The direction of the beam B1 inside the substrate is defined by a zenith angle $\theta_C$ and an azimuthal angle $\phi_C$. The zenith angle $\theta_C$ and the azimuthal angle $\phi_C$ are governed by diffraction equations (6) and (7), when the light is diffracted into the substrate at the diffraction order −1 and/or at the diffraction order 1.

$$n\sin\theta_C\sin\varphi_C = \gamma_0, \text{ and} \quad (6)$$

$$n\sin\theta_C\cos\varphi_C = \alpha_0 \pm \frac{\lambda}{d_0}, \quad (7)$$

where $d_0$ is the grating period of the input grating 10. The grating period $d_0$ of the input grating 10 and the refractive index n of the waveguiding substrate 7 may be selected such that higher than first order diffractions are not allowed. In other words, the diffraction order m at the in-coupling may be −1 or 1. The grating period $d_0$ of the input grating 10 may be in the range of $\lambda/2$ to $\lambda$, where 2 is a predetermined wavelength of visible light.

In particular, the grating period $d_0$ of the input grating 10 may be selected to be substantially equal to $\pi/1(1+\alpha_{MAX})$, where $\alpha_{MAX}$ is a maximum absolute value of the expression $\sin\theta_{IN}\cos\phi_{IN}$ for a predetermined range of zenith angles $\theta_{IN}$ and azimuthal angles $\phi_{IN}$. Said predetermined range of angles $\theta_{IN}$ and $\phi_{IN}$ may be selected to correspond to the directions of the input beams B0 provided by an optical engine 100, i.e. said predetermined range of angles $\theta_{IN}$ and $\phi_{IN}$ may be selected to correspond to a predetermined width of a micro-display 110 and to a predetermined focal length of the imaging optics 120. In particular, the grating period $d_o$ may be selected to be substantially equal to 80% of the wavelength A. In particular, the wavelength 2 may be 550 nm.

The in-coupled beam B1 impinges on the crossed grating 20 and may be split into sub-beams $S_{00}$, $S_{01}$, $S_{10}$ and $S_{11}$ shown in FIG. 4. The formation of the sub-beams may be governed by diffraction equations (8) and (9):

$$n\sin\theta_{R1}\cos\varphi_{R1} = n\sin\theta_C\cos(\varphi_C - \rho) + p_1\frac{\lambda}{d_1} \quad (8)$$

$$n\sin\theta_{R1}\sin\varphi_{R1} = n\sin\theta_C\sin(\varphi_C - \rho) + p_2\frac{\lambda}{d_2} \quad (9)$$

The grating periods $d_1$ and $d_2$ associated with the crossed grating 20 are selected according to eqs. (1) and (2). The angle $\rho$ defines the orientation of the lines 25 along which the diffractive features 23 are arranged (FIGS. 5b and 5c). $p_1$ denotes a reflective diffraction order associated with the interaction between the beam B1 and the first inclined grating of the crossed grating 20 at the first location EC1. $p_2$ denotes a reflective diffraction order associated with the interaction between the beam B1 and the second inclined grating of the crossed grating 20 at the first location EC1. The diffraction equations (8) and (9) describe the formation of a first sub-beam. Thus, the diffraction orders $p_1$ and $p_2$ form a group which is associated with the formation of said first sub-beam. The symbols $\theta_{R1}$ and $\phi_{R1}$ denote the zenith angle and the azimuthal angle of the direction of said first sub-beam which is associated with the diffraction orders $p_1$ and $p_2$ (said angles are not shown in Figs).

Using eqs. (1), (2), (6), and (7), eqs. (8) and (9) may be rewritten into a form:

$$n\sin\theta_{R1}\cos\varphi_{R1} = \alpha_0\cos\rho + \gamma_0\sin\rho + \frac{\lambda}{d_0}(\pm 1 + 2p_1)\cos\rho \quad (10)$$

$$n\sin\theta_{R1}\sin\varphi_{R1} = \gamma_0\cos\rho - \alpha_0\sin\rho + \frac{\lambda}{d_0}(\mp 1 + 2p_2)\sin\rho \quad (11)$$

Some diffraction orders $p_1$, $p_2$ may correspond to a situation where the crossed grating 20 diffracts light out of the waveguiding substrate 7, i.e. they correspond to transmissive diffraction modes. However, the grating periods $d_0$, $d_1$ and $d_2$ may be selected such that substantially no light is diffracted out of the substrate by crossed grating 20. In other words, the grating period $d_1$, the grating period $d_2$, and the grating period $d_0$ may be selected to substantially prevent out-coupling of light through said crossed grating (20).

Sub-beams $S_{00}$, $S_{01}$, $S_{10}$ and $S_{11}$ are generated according to eqs. (10) and (11) at the location of first interaction EC1. The generated sub-beams propagate within the substrate 7 until they impinge on the crossed grating 20 again, at the second locations of interaction EC2. The diffraction at the second locations of interaction EC2 is governed by eqs. (12) and (13).

$$n\sin\theta_{R2}\cos\varphi_{R2} = n\sin\theta_{R1}\cos\varphi_{R1} = q_1\frac{\lambda}{d_1} \quad (12)$$

$$n\sin\theta_{R2}\sin\varphi_{R2} = n\sin\theta_{R1}\sin\varphi_{R1} = q_2\frac{\lambda}{d_2} \quad (13)$$

which may be rewritten into the form:

$$n\sin\theta_{R2}\cos\varphi_{R2} = \alpha_0\cos\rho + \gamma_0\sin\rho + \frac{\lambda}{d_0}(\pm 1 + 2p_1 + 2q_1)\cos\rho \quad (14)$$

$$n\sin\theta_{R2}\sin\varphi_{R2} = \gamma_0\cos\rho - \alpha_0\sin\rho + \frac{\lambda}{d_0}(\mp 1 + 2p_2 + 2q_2)\sin\rho \quad (15)$$

where $q_1$ denotes a reflective diffraction order associated with the interaction between the first sub-beam and the first inclined grating of the crossed grating 20 at a second location EC2. $q_2$ denotes a reflective diffraction order associated with the interaction between said first sub-beam and the second inclined grating of the crossed grating 20 at said second location EC2. The diffraction equations (14) and (15) describe the formation of a second sub-beam. Thus, the diffraction orders $p_1$, $p_2$, $q_1$ and $q_2$ form a group which is associated with the formation of said second sub-beam. The symbols $\theta_{R2}$ and $\phi_{R2}$ (not shown in Figs) denote the zenith angle and the azimuthal angle, respectively, of the direction of said second sub-beam associated with the diffraction orders $p_1$, $p_2$, $q_1$ and $q_2$.

The second interaction may provide sub-beams $V_{00}$, $V_{01}$, $V_{10}$, $V_{11}$, $U_{00}$, $U_{01}$, $U_{10}$ $U_{11}$ as shown in FIG. 4. The azimuthal angle of some sub-beams may be the same as the original azimuthal angle of the in-coupled beam B1.

The output grating 30 may couple light of the sub-beams out of the waveguiding substrate 7. In particular, the output grating 30 may couple light of said second sub-beam out of the waveguiding substrate 7. The zenith angle $\theta_{OUT}$ and the azimuthal angle $\phi_{OUT}$ of the output beam B2 are governed by the equations (16) and (17):

$$\sin\theta_{OUT}\sin\varphi_{OUT} = n\sin\theta_{R2}\sin(\varphi_{R2} + \rho) \quad (16)$$

$$n\sin\theta_{OUT}\cos\varphi_{OUT} = n\sin\theta_{R2}\cos(\varphi_{R2} + \rho) + s\frac{\lambda}{d_0} \quad (17)$$

which can be rewritten as equations (18), (19), (20) and (21):

$$\sin\theta_{OUT}\sin\varphi_{OUT} = n\sin\theta_{R2}\sin\varphi_{R2}\cos\rho + n\sin\theta_{R2}\cos\varphi_{R2}\sin\rho \quad (18)$$

$$n\sin\theta_{OUT}\cos\varphi_{OUT} = n\sin\theta_{R2}\cos\varphi_{R2}\cos\rho - n\sin\theta_{R2}\sin\varphi_{R2}\sin\rho + s\frac{\lambda}{d_0} \quad (19)$$

$$\sin\theta_{OUT}\sin\varphi_{OUT} = \gamma_0 + 2\frac{\lambda}{d_0}\sin\rho\cos\rho[r_1 + p_1 + r_2 + p_2] \quad (20)$$

$$n\sin\theta_{OUT}\cos\varphi_{OUT} = \quad (21)$$
$$\alpha_0 + \frac{\lambda}{d_0}[\pm 1 + 2((r_1 + p_1))\cos^2\rho + ((-r_2 - p_2))\sin^2\rho + s]$$

where s denotes the order of diffraction at the output grating 30.

It is desired for the beam expansion that the output beam B2 propagates substantially in the same direction as the input beam B0. Consequently, it is desired that the zenith angle $\theta_{OUT}$ of the output beam B2 is equal to the zenith angle $\phi_{IN}$ of the input beam B0, and that the azimuthal angle $\phi_{OUT}$ of the output beam B2 is equal to the azimuthal angle $\phi_{OUT}$ of the input beam B0.

Now, on the basis of the equations (20) and (21), the conditions for attaining an output beam B2 which propagates in the same direction as the input beam B0 may be defined by equations (22) and (23):

$$-p_2-q_2=p_1++q_1 \quad (22)$$

$$\pm 1+2(p_1+q_1)+s=0 \quad (23)$$

Table 1 summarizes some combinations of diffraction orders which correspond to an output beam B2 propagating in the same direction as the input beam B0.

The combination of diffraction orders listed on line 1 of Table 1 corresponds to the sub-beam $S_{00}$ (FIG. 4), which propagates in the same direction as the in-coupled beam B1.

The combination of diffraction orders listed on line 2 of Table 1 corresponds to the sub-beam $S_{11}$, which propagates in a direction opposite the direction of the in-coupled beam B1. The combination of diffraction orders listed on line 3 of Table 1 corresponds also to a sub-beam which propagates in a direction opposite the direction of the input beam B1.

The combination of diffraction orders listed on line 4 of Table 1 corresponds to situation where a transversely diffracted sub-beam $S_{10}$ provides a further sub-beam $V_{01}$ which propagates in the same direction as the in-coupled beam B1. The sub-beam $V_{01}$ has been shifted sideways with respect to the original in-coupled beam B1.

The combination of diffraction orders listed on line 5 of Table 1 corresponds to situation where a transversely diffracted sub-beam $S_{10}$ provides a further sub-beam $V_{10}$ which propagates in a direction opposite to the direction of the in-coupled beam B1. The sub-beam $V_{10}$ has been shifted sideways with respect to the original in-coupled beam B1.

Light of those sub-beams, e.g. $S_{00}$ and $V_{01}$ which propagate in the same direction as the in-coupled beam B1 may be coupled out of the substrate 7 by a first output grating 30 or 30a (FIG. 9). Light of those sub-beams, e.g. $S_{11}$ and $V_{10}$ which propagate in the direction opposite the direction of the in-coupled beam B1 may be coupled out of the substrate 7 by a second output grating 30b which is on the other side of the diffractive beam expander 50.

Table 2 summarizes other combinations of diffraction orders for in-coupling diffraction order m=1. It is noticed that the combinations of Table 2 do not provide an output beam from the output grating 30.

There may be more interactions than those which take place at the two consecutive interactions at the locations EC1 and EC2. However, further sub-beams generated at the further interactions propagate in the same directions as the sub-beams generated by the two interactions. Thus, the beam expansion by the crossed grating 20 may be substantially governed by the equations described above.

Referring to FIG. 9, the diffractive beam expander 50 may also be bi-ocular. The input grating 10 may be adapted to diffract light towards a first crossed grating 20a and a second crossed grating 20b. The expander 50 may have a first output grating 30a to provide a beam B2 for a right eye of an observer, and a second output grating 30b to provide a beam B2 for a left eye of an observer. Light of backwards-propagating sub-beams may be utilized effectively when the input grating 10 and one or two the crossed gratings 20a, 20b are between two output gratings 30a, 30b.

The diffractive beam expander 50 may be used to implement a virtual display device 200 shown in FIG. 10. The output beams B2 provided by the output gratings 30a, 30b to the eyes E1, E2 of a viewer provide for a viewer an impression of a virtual image 710 displayed at an infinite distance from the viewer. The virtual image 710 may be e.g. a star pattern as shown in FIG. 10, corresponding to a real image 605 generated by the micro-display 110 (FIG. 2b).

The display device of FIG. 10 may further comprise earpieces 260 which may be positioned on the ears of a viewer in order to facilitate positioning of the diffractive beam expander 50 in front of the eyes E1, E2 of the viewer. The display device 200 may also be attached to a headgear, e.g. to a helmet.

A bi-ocular display device 200 may comprise two separate optical engines 100 and two separate mono-ocular beam expanders 50 in order to show stereoscopic virtual images. The diffractive beam expander 50 may be partially transparent, allowing the user to see his environment through the viewing aperture 35 of the expander 50 while also viewing a displayed virtual image 710. This transparent arrangement may be applied in augmented reality systems.

Figure 11:
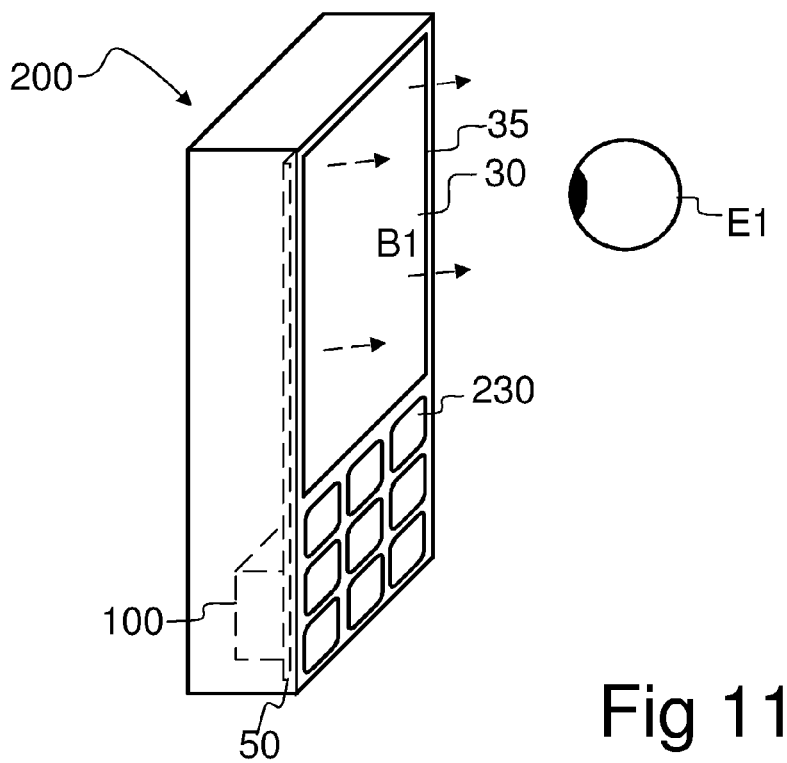
FIG. 11 shows, in a three dimensional view, a display device for showing virtual images.

FIG. 11 shows a device 200 comprising a mono-ocular virtual display implemented by using the diffractive beam expander 50. The device 200 may further comprise e.g. a key set 230 for controlling said device.

The device 200 of FIG. 10 or 11 may further comprise e.g. data processing unit, memory and communications unit to provide access to a mobile telephone network, internet or local area network. The device 200 may be, for example, selected from the following list: a display module connectable to a further device, portable device, device with wireless telecommunicating capabilities, imaging device, mobile phone, gaming device, music recording/playing device (based on e.g. MP3-format), remote control transmitter or receiver, navigation instrument, measuring instrument, target finding device, aiming device, navigation device, personal digital assistant (PDA), communicator, portable internet appliance, hand-held computer, accessory to a mobile phone.

For the person skilled in the art, it will be clear that modifications and variations of the devices and the method according to the present invention are perceivable. The drawings are schematic. The particular embodiments described above with reference to the accompanying drawings and tables are illustrative only and not meant to limit the scope of the invention, which is defined by the appended claims.

TABLE 1

Diffraction orders which provide an output beam B2, which propagates in the same direction as the input beam B0

| Line | Diffraction order m at in-coupling m | Diffraction order $p_1$ at Location EC1 $p_1$ | Diffraction order $p_2$ at location EC1 $p_2$ | Diffraction order $q_1$ at location EC2 $q_1$ | Diffraction order $q_2$ at location EC2 $q_2$ | Diffraction order s at out-coupling s |
|---|---|---|---|---|---|---|
| 1 | +1 | 0  | 0  | 0  | 0  | −1 |
| 2 | +1 | −1 | −1 | 0  | 0  | +1 |
| 3 | +1 | 0  | 0  | −1 | −1 | +1 |
| 4 | +1 | −1 | 0  | 1  | 0  | −1 |
| 5 | +1 | −1 | 0  | 0  | −1 | +1 |

TABLE 2

Diffraction orders which do not allow out-coupling of light at the output grating. Marking n.e. denotes that diffracted light does not propagate.

| Diffraction order m at in-coupling m | Diffraction order $p_1$ at Location EC1 $p_1$ | Diffraction order $p_2$ at location EC1 $p_2$ | Diffraction order $q_1$ at location EC2 $q_1$ | Diffraction order $q_2$ at location EC2 $q_2$ | Diffraction order s at out-coupling s |
|---|---|---|---|---|---|
| +1 | 1  | 1  | n.e. | n.e. | n.e. |
| +1 | 1  | 0  | n.e. | n.e. | n.e. |
| +1 | 1  | −1 | n.e. | n.e. | n.e. |
| +1 | 0  | 1  | n.e. | n.e. | n.e. |
| +1 | 0  | 0  | 1    | n.e. | n.e. |
| +1 | 0  | 0  | 0    | 1    | n.e. |
| +1 | 0  | 0  | 0    | −1   | n.e. |
| +1 | 0  | 0  | −1   | 1    | n.e. |
| +1 | 0  | 0  | −1   | 0    | n.e. |
| +1 | −1 | 1  | n.e. | n.e. | n.e. |
| +1 | −1 | 0  | 1    | 1    | n.e. |
| +1 | −1 | 0  | 1    | −1   | n.e. |
| +1 | −1 | 0  | 0    | 1    | n.e. |
| +1 | −1 | 0  | −1   | n.e. | n.e. |
| +1 | −1 | −1 | 1    | 1    | n.e. |
| +1 | −1 | −1 | 1    | 1    | n.e. |
| +1 | −1 | −1 | 1    | 0    | n.e. |
| +1 | −1 | −1 | 1    | −1   | n.e. |
| +1 | −1 | −1 | 0    | 1    | n.e. |
| +1 | −1 | −1 | 0    | −1   | n.e. |
| +1 | −1 | −1 | −1   | n.e. | n.e. |

The invention claimed is:

1. A device comprising
a substantially planar waveguiding substrate,
an input grating to couple an input beam into said substrate to form an in-coupled light beam,
a crossed grating to provide sub-beams by diffracting light of said in-coupled light beam, and
an output grating to couple light of said sub-beams out of said substrate in order to provide an output beam,
wherein the light of said in-coupled light beam is adapted to interact with said crossed grating two or more times, interaction at a first location providing a first sub-beam and a second sub-beam, said first sub-beam and said second sub-beam propagating in different directions, an interaction of said second sub-beam with said crossed grating at a second location providing a third sub-beam propagating in the same direction as said first sub-beam, said output beam being adapted to have substantially the same direction as said input beam, said input grating comprising substantially linear diffractive features having a grating period $d_0$, said crossed grating comprising further diffractive features arranged along lines of a first set of substantially parallel lines, said further diffractive features being also arranged along lines of a second set of substantially parallel lines, the lines of said first set being perpendicular to the lines of said second set, said first set having a first grating period $d_1$, said second set having a second grating period $d2$, the lines of said first set having an angle ρ with respect to the substantially linear features of said input grating, said angle ρ being in the range of 30 to 60 degrees, a constant $A_0$ being in the range of 1.8 to 2.2, said first grating period $d_1$ fulfilling a condition $d_0 = A_0 d_1 \sin\rho$, and said second grating period $d_2$ fulfilling a condition $d_0 = A_0 d_2 \cos\rho$.

2. The device according to claim 1 wherein said constant $A_0$ is equal to two.

3. The device according to claim 1 wherein said first grating period $d_1$, said second grating period $d_2$, and said grating period $d_0$ have been selected to substantially prevent out-coupling of light through said crossed grating.

4. The device according to claim 1 wherein the grating period $d_0$ of said input grating is in the range of $\lambda/2$ to $\lambda$, where $\lambda$ is a predetermined wavelength of light.

5. The device according to claim 4 wherein the grating period $d_0$ of said input grating is substantially equal to $\lambda/(1 + \alpha_{MAX})$, where $\alpha_{MAX}$ is a maximum absolute value of $\sin\theta_{IN}\cos\phi_{IN}$ for a predetermined range of angles $\theta_{IN}$ and $\phi_{IN}$, said angle $\theta_{IN}$ being an angle between the direction of said input beam and the surface normal of said input grating and said angle $\phi_{IN}$ being an angle between the projection of the light beam on the substrate surface and a reference direction, which is perpendicular to said surface normal and said linear diffractive features of said input grating.

6. The device according to claim 1 wherein said crossed grating is a surface relief grating.

7. The device according to claim 6 wherein said crossed grating is a slanted surface relief grating.

8. The device according to claim 1 comprising two output gratings.

9. The device according to claim 5 comprising two output gratings.

10. A method for expanding a light beam by using a diffractive beam expander, said diffractive beam expander comprising:
a substantially planar waveguiding substrate,
an input grating to couple an input beam into said substrate to form an in-coupled light beam,
a crossed grating to provide sub-beams by diffracting light of said in-coupled light beam, and
an output grating to couple light of said sub-beams out of said substrate in order to provide an output beam,
wherein said input grating comprises substantially linear diffractive features having a grating period $d_0$, said crossed grating comprising further diffractive features arranged along lines of a first set of substantially parallel lines, said further diffractive features being also arranged along lines of a second set of substantially parallel lines, the lines of said first set being perpendicular to the lines of said second set, said first set having a first grating period $d_1$, said second set having a second grating period $d_2$, the lines of said first set having an angle $\rho$ with respect to the substantially linear features of said input grating, said angle $\rho$ being in the range of 30 to 60 degrees, a constant $A_0$ being in the range of 1.8 to 2.2, said first grating period $d_1$ fulfilling a condition $d_0=A_0 d_1 \sin\rho$, and said second grating period $d_2$ fulfilling a condition $d_0=A_0 d_2 \cos\rho$, said method comprising:

coupling an input beam into said substrate by said input grating in order to form an in-coupled beam, diffracting light of said in-coupled beam by said crossed grating at a first location in order to provide at least a first sub-beam and a second sub-beam, said first sub-beam and said second sub-beam propagating in different directions, diffracting light of said second sub-beam at a second location in order to provide a third sub-beam propagating in the same direction as said first sub-beam, and coupling light of said first sub-beam and said third sub-beam out of said substrate in order to form an output beam which propagates substantially in the same direction as said input beam.

11. The method according to claim 10 wherein the grating period $d_0$ of said input grating is in the range of $\lambda/2$ to $\lambda$, where $\lambda$ is a predetermined wavelength of light.

12. A device comprising a micro-display, imaging optics, and a diffractive beam expander, wherein said imaging optics is adapted to convert a real image displayed by said micro-display into a virtual image observable through a viewing aperture of said diffractive beam expander, said diffractive beam expander in turn comprising:

a substantially planar waveguiding substrate, an input grating to couple an input beam into said substrate to form an in-coupled light beam, a crossed grating to provide sub-beams by diffracting light of said in-coupled light beam, and an output grating to couple light of said sub-beams out of said substrate in order to provide an output beam, wherein the light of said in-coupled light beam is adapted to interact with said crossed grating two or more times, interaction at a first location providing a first sub-beam and a second sub-beam, said first sub-beam and said second sub-beam propagating in different directions, an interaction of said second sub-beam with said crossed grating at a second location providing a third sub-beam propagating in the same direction as said first sub-beam, said output beam being adapted to have substantially the same direction as said input beam, said input grating comprising substantially linear diffractive features having a grating period $d_0$, said crossed grating comprising further diffractive features arranged along lines of a first set of substantially parallel lines, said further diffractive features being also arranged along lines of a second set of substantially parallel lines, the lines of said first set being perpendicular to the lines of said second set, said first set having a first grating period $d_1$, said second set having a second grating period $d_2$, the lines of said first set having an angle $\rho$ with respect to the substantially linear features of said input grating, said angle $\rho$ being in the range of 30 to 60 degrees, a constant $A_0$ being in the range of 1.8 to 2.2, said first grating period $d_1$ fulfilling a condition $d_0=A_0 d_1 \sin\rho$, and said second grating period $d_2$ fulfilling a condition $d_0=A_0 d_2 \cos\rho$.

13. The device according to claim 12 wherein said beam expander comprises two output gratings.

14. A method for displaying virtual images by using a micro-display, imaging optics, and a diffractive beam expander, said beam expander comprising:

a substantially planar waveguiding substrate, an input grating to couple an input beam into said substrate to form an in-coupled light beam, a crossed grating to provide sub-beams by diffracting light of said in-coupled light beam, and an output grating to couple light of said sub-beams out of said substrate in order to provide an output beam, wherein said input grating comprises substantially linear diffractive features having a grating period $d_0$, said crossed grating comprising further diffractive features arranged along lines of a first set of substantially parallel lines, said further diffractive features being also arranged along lines of a second set of substantially parallel lines, the lines of said first set being perpendicular to the lines of said second set, said first set having a first grating period $d_1$, said second set having a second grating period $d2$, the lines of said first set having an angle $\rho$ with respect to the substantially linear features of said input grating, said angle $\rho$ being in the range of 30 to 60 degrees, a constant $A_0$ being in the range of 1.8 to 2.2, said first grating period $d_1$ fulfilling a condition $d_0=A_0 d_1 \sin\rho$, and said second grating period $d_2$ fulfilling a condition $d_0=A_0 d_2 \cos\rho$, said method comprising:

collimating light transmitted from an image point of said micro-display by using said imaging optics in order to form an input beam, coupling said input beam into said substrate by said input grating in order to form an in-coupled beam, diffracting light of said in-coupled beam by said crossed grating at a first location in order to provide at least a first sub-beam and a second sub-beam, said first sub-beam and said second sub-beam propagating in different directions, diffracting light of said second sub-beam at a second location in order to provide a third sub-beam propagating in the same direction as said first sub-beam, and coupling light of said first sub-beam and said third sub-beam out of said substrate in order to form an output beam which propagates substantially in the same direction as said input beam;

said output beam together with other output beams corresponding to other image points of said micro-display providing a virtual image observable through a viewing aperture of said output grating.

15. The method according to claim 14 wherein said beam expander comprises two output gratings.

* * * * *